(12) United States Patent
Dong

(10) Patent No.: US 11,026,164 B2
(45) Date of Patent: Jun. 1, 2021

(54) METHOD FOR WIRELESS AUTOMATIC NETWORKING

(71) Applicant: Guangdong Industry Polytechnic, Guangzhou (CN)

(72) Inventor: Bing Dong, Guangzhou (CN)

(73) Assignee: Guangdong Industry Polytechnic

( * ) Notice: Subject to any disclaimer, the term of this patent is extended or adjusted under 35 U.S.C. 154(b) by 12 days.

(21) Appl. No.: 16/320,182

(22) PCT Filed: Jan. 25, 2018

(86) PCT No.: PCT/CN2018/074099
§ 371 (c)(1),
(2) Date: Jan. 24, 2019

(87) PCT Pub. No.: WO2018/141225
PCT Pub. Date: Aug. 9, 2018

(65) Prior Publication Data
US 2019/0246341 A1     Aug. 8, 2019

(30) Foreign Application Priority Data

Feb. 6, 2017 (CN) .......................... 201710066215.7

(51) Int. Cl.
*H04W 48/16* (2009.01)
*H04L 12/44* (2006.01)
(Continued)

(52) U.S. Cl.
CPC ............ *H04W 48/16* (2013.01); *H04B 1/713* (2013.01); *H04B 17/318* (2015.01); *H04L 12/44* (2013.01);
(Continued)

(58) Field of Classification Search
CPC ..... H04W 48/16; H04W 84/18; H04W 48/12; H04W 24/02; H04W 48/10;
(Continued)

(56) References Cited

U.S. PATENT DOCUMENTS

| 2002/0075940 A1 | 6/2002 | Haartsen |
| 2005/0003827 A1* | 1/2005 | Whelan ................. H04W 16/10 455/454 |

(Continued)

FOREIGN PATENT DOCUMENTS

| CN | 101820660 A | 9/2010 |
| CN | 106230539 A | 12/2016 |

(Continued)

*Primary Examiner* — Andrew Lai
*Assistant Examiner* — Mohammed M Murshid
(74) *Attorney, Agent, or Firm* — The Webb Law Firm

(57) ABSTRACT

A method for wireless automatic networking includes: pre-selecting N frequencies for frequency-hopping, if a relay node requires frequency hopping, then transmitting a beacon to routing nodes, if the routing nodes do not receive the beacon, then the routing nodes hop frequencies, search, and track until the beacon is received; work frequencies of the relay node, of the routing nodes, and of a terminal node are established in a shared channel; then, insofar as the transmit powers of the nodes are optimized, each routing node is tested for the presence of a frequency conflict with other routing nodes; if found, then frequencies are reassigned to the conflicting routing nodes until none of the frequencies of the routing nodes overlap each other; the relay node sequentially loads the frequencies of the routing nodes, and when frequency loading is completed for all of the routing nodes, a network enters a normal working state.

10 Claims, 3 Drawing Sheets

(51) Int. Cl.
*H04W 48/12* (2009.01)
*H04B 17/318* (2015.01)
*H04B 1/713* (2011.01)
*H04W 84/18* (2009.01)

(52) U.S. Cl.
CPC ........... *H04W 48/12* (2013.01); *H04W 84/18* (2013.01); *Y02D 30/70* (2020.08)

(58) Field of Classification Search
CPC .... H04W 52/245; H04W 52/46; H04L 12/44; H04B 17/318; H04B 1/713; H04B 17/345; Y02D 30/70
See application file for complete search history.

(56) References Cited

U.S. PATENT DOCUMENTS

| | | | | |
|---|---|---|---|---|
| 2008/0107071 A1* | 5/2008 | Tsigler | ................ | H04W 16/10 370/329 |
| 2017/0026970 A1* | 1/2017 | Pack | ................ | H04W 72/0426 |
| 2018/0159662 A1* | 6/2018 | Ao | ................ | H04L 67/12 |
| 2019/0334576 A1* | 10/2019 | Yabata | ................ | H04W 84/10 |

FOREIGN PATENT DOCUMENTS

| | | | |
|---|---|---|---|
| CN | 106793014 A | | 5/2017 |
| WO | 0249272 A2 | | 6/2002 |

* cited by examiner

METHOD FOR WIRELESS AUTOMATIC NETWORKING

CROSS-REFERENCE TO RELATED APPLICATIONS

This application is the United States national phase of International Application No. PCT/CN2018/074099 filed Jan. 25, 2018, and claims priority to Chinese Patent Application No. 201710066215.7 filed Feb. 6, 2017, the disclosures of each of which are hereby incorporated by reference in their entireties.

BACKGROUND OF THE INVENTION

Field of the Invention

The present invention relates to the field of wireless networking research, and in particular, to a method for wireless automatic networking.

Description Of Related Art

Wireless networking refers to the networking of wireless devices to implement resource sharing among devices. The networking methods include the following methods: networking in the LAN, point-to-point wireless connection, point-to-multipoint wireless connection, reply connection, mesh connection, etc.

The relay connection refers to the wireless networking between two networks, but there are obstacles between the geographical positions of the two networks or the distance between them is too long. To this end, a relay point is established between the two networks. To enable two networks to establish a connection through relaying. However, at present, the following problems exist in the relay connection: first, each wireless node in the network does not have an automatic frequency hopping function, and has weak anti-interference ability to the frequency environment, and is susceptible to same-frequency interference; and second, the working frequency of each wireless node needs to be manually set, the versatility is not strong, and the non-professionals cannot perform the networking operation.

Therefore, it is of great research significance and practical value to seek a method to realize wireless automatic networking without changing the structure of the original wireless node.

SUMMARY OF THE INVENTION

The present invention provides a method for wireless automatic networking for a problem that the current low-speed data transmission wireless network (or wireless sensor network) cannot automatically hop in an interference environment. The method adopts an automatic hopping algorithm with good operability, strong versatility and high reliability as the core. Based on the wireless networking, the relay nodes, routing nodes and terminal nodes can automatic join the network without changing the original wireless node structure to complete the automatic networking process of each node without manual operation.

The object of the present invention is achieved by the following technical solution: A method for wireless automatic networking, wherein a network adopts a layered network structure, including a relay layer, a routing layer and a terminal layer, a star connection is adopted between a relay node on the relay layer and a routing node on the subordinate routing layer, and a star connection is also adopted between the routing node and a terminal node on the subordinate terminal layer; and the method includes the steps of:

pre-selecting N working channels between working frequency bands as N hopping frequencies;

setting an RSSI threshold of the routing node, wherein when an RSSI detected in real time is higher than the RSSI threshold, the routing node determines that it is interfered, reports to the corresponding relay node to apply for frequency hopping, and the relay node hops and sends a beacon to the routing node, and if the routing node does not receive the beacon, the routing node hops to search and track until the beacon is received, to ensure that the relay node shares the same channel with each routing node, and the routing node locks the shared channel;

establishing working frequencies of the routing node and each terminal node on the shared channel, calculating an optimal power value of the routing node and each terminal node during communication respectively, and then testing whether each routing node conflicts with the frequencies of other routing nodes under the premise that the transmit power of the routing node and the terminal node is optimal, and if so, the frequencies of the conflicting routing nodes are reallocated until the frequencies of the routing nodes do not conflict; and loading, by the relay node, the frequency of each routing node successively, wherein when the routing node receives a frequency value, it first notifies each terminal node to change frequency on the shared channel, and confirms that each terminal node receives frequency-changing data, and then automatically changes the frequency from a shared frequency to a new frequency; after a polling test is performed on each terminal node on the new frequency, the frequency being successfully loaded is reported to the relay node; and after all the routing nodes complete frequency loading, the network enters a normal working state.

Preferably, the method for determining the frequency hopping of the relay node is: (1-1) the routing node samples an RSSI value of a listening channel on the N working channels on the N working channels in a frequency hopping area for time T1, and takes an RSSI average value on the N channels, and based on the average value, after an increment, it is used as the RSSI threshold of the routing node, and the RSSI threshold is updated every T2 time; and (1-2) selecting a channel with the smallest RSSI value as the working frequency of the current relay node, wherein when an RSSI detected in real time is higher than the RSSI threshold, the relay node hops and the frequency hopping adopts cyclic frequency hopping.

Preferably, the relay node transmits a beacon to each routing node according to a certain timing, the beacon is a broadcast data packet, the broadcast data packet includes a determined flag, and if the routing node receives the flag, it indicates that its shared channel is the same as the relay node.

Further, during the synchronization operation of the network system by the relay node, the routing node uses cyclic frequency hopping for searching and tracking the beacon, and the specific settings are as follows:

(2-1) frequency hopping slot setting: the routing node is in a receiving state, a receiving slot of each frequency is set to T3 to ensure that the beacons of any frequency can be tracked under the slots of N different frequencies, and after receiving more than P beacon data packets continuously, the receiving frequency is locked and the shared channel is entered;

(2-2) setting of the optimal transmit power of the routing node: the relay node re-transmits to the relay node RSSI data detected when the relay node replies data, and the routing node adjusts its transmit power to the optimal transmit power value;

(2-3) transmission slot setting: if the routing node still does not receive any beacon after the slots of P different frequencies have passed, it indicates that the relay node does not send any beacon or the transmit power is small, at this time, a search state is entered, and under the search state, in addition to completing the search for N channels, the data exchange slot of the routing node and its terminal node is also included to realize the periodic control of the terminal node by the routing node; meanwhile, after searching for one cycle, the power of the routing node is increased by one level, and if no beacon is received when the power is increased to the maximum, it is deemed that the relay node does not send any beacon; and (2-4) frequency hopping initial value setting: when the frequency of the routing node is in a locked receiving frequency state, if no beacon data packet is suddenly received, the current frequency is used as the initial value of the frequency hopping search to start the search.

Further, after the relay node sends out the M groups of beacons, the channel of each routing node can theoretically jump to the shared channel, polling is started from the (M+1)th group, and after receiving a reply from the routing node, it determines that the channel is shared, otherwise, the relay node continues polling under the premise of not stopping other work, and if there is no reply X times, it will report through Ethernet, and the routing node is designated as fault handling.

Preferably, the routing node communicates with each terminal node in a polling manner, and the routing node obtains an optimal power value for communication with the terminal node respectively during data transmission, denoted as Ps1, Ps2, . . . , Psk, where Psk is an optimal power value for communication between the sth routing node and its corresponding kth terminal node, the maximum value Psimax in the above optimal power values is taken as the optimal power value of the sth routing node; at the same time, the terminal node obtains an optimal power value for communication with the routing node, denoted as Pe1, Pe2, . . . , Peu, where Peu is an optimal power value for communication between the uth terminal node with its corresponding eth route node.

Preferably, the step of testing whether each routing node conflicts with the frequency of other routing nodes is:

after the working frequencies of the relay node, the corresponding routing node and its terminal nodes are all established on the shared channel, the relay node starts broadcasting, each routing node receives a TEST character and reports same, and instructs the routing node No. 1 to poll each terminal node corresponding to the routing node No. 1 with the TEST character, and also replies with the TEST character to detect the routing number in which the routing node No. 1 conflicts with the frequencies of other routing node areas, upload the relay node and list same into a corresponding conflict table; and similarly, the routing numbers of all routing nodes conflicting with the frequencies of other routing nodes are detected; and a routing frequency conflict table is formed, the conflicting table including a routing number and a routing number that conflicts with its frequency.

Further, the step of reallocating the frequencies of the conflicting routing nodes is: allocating the frequencies from low to high and first odd and then even according to the routing number, that is, according to the following order: F1, F3, F5, . . . , FV, F2, F4, F6, . . . , FG, where V is an odd number, G=V+1 is an even number, scanning whether there is a routing number that is the same as the set frequency among the routing numbers that conflict with its frequency, and if so, continuing scanning from small to large frequency until the frequency is different.

Preferably, in the process of completing networking for communication, the routing node is monitored in real time for interference, and if it is interfered, the routing node is automatically frequency-changed, and the steps are as follows:

(3-1) determining whether the current interference is the interference of the network system or the external interference through the RSSI and the received data format, and if it is the interference of the network system, step (3-2) is performed, otherwise, step (3-3) is performed;

(3-2) the current routing node reports to the relay node after suffering from the interference of the network system, and the relay node invokes the routing frequency conflict table to find the frequency of the interfered routing node number, and replaces a new frequency that is not used by the network in order, and then tests whether the interference is eliminated until the interference is eliminated, the frequency at this time is the new frequency of the routing node, and the updated frequency number is recorded in a frequency update table; and (3-3) the current routing node reports to the relay node after suffering from external interference, and the relay node invokes the routing frequency conflict table to find the frequency of the interfered routing node number, and replaces a new frequency that is not used by the network in sequence, and then tests whether the interference is eliminated until the interference is eliminated, and the frequency at this time is the dynamic new frequency of the routing node and is recorded in a frequency hopping update table; and when the routing node is confirmed to be interfered by the external frequency, the routing node will jump between the original frequency and the dynamic new frequency.

Further, in the step (3-1), the specific step of determining whether the current interference is the interference of the network system or the external interference is:

(3-1-1) setting the RSSI threshold of the routing node: under a set single frequency, if the communication is normal, the current RSSI is sampled three times continuously, and an average value is taken as the current RSSI threshold, the RSSI threshold is updated every minute; and (3-1-2) when the RSSI detected in real time is higher than the RSSI threshold, the routing node is considered to be interfered, and if the data received by the routing node is an identifier of the network system, the current interference is considered to be the network system interference; and if the routing node receives garbled characters, the current interference is considered to be external interference.

Compared with the prior art, the present invention has the following advantages and beneficial effects:

1. The present invention is based on a three-layer network structure formed by a relay node, a routing node, and a terminal node. Since the terminal nodes are mostly densely distributed in the same area, the same-frequency interference problem must be solved. The method of the present invention has the functions of automatically identifying the used frequency point and the automatic frequency avoiding function, and can automatically adjust the RF frequency and power without manually selecting the frequency point, so as to achieve the minimum radiation range, so that the system can accommodate the maximum number of terminal nodes in the same area. For different units to use the same wireless network in the same area, the method of the present invention can identify different network nodes and automatically allocate frequency and power.

2. In the method of the present invention, the routing node in the independent area and the terminal nodes adopt the same-frequency transmission and reception automatic synchronization mode; the areas realize the wireless networking through the relay node; the relay node and the routing nodes in each area adopt the same-frequency transmission and reception automatic synchronization mode; the control center to each relay node accesses a central computer through an Ethernet port, and realizes automatic network-joining of each node and automatic connection with the Internet.

3. The method of the present invention adopts the automatic frequency hopping algorithm as the core, based on the wireless networking, realizes the automatic network-joining of the relay node, the routing node and the terminal node without changing the structure of the original wireless node, and completes an automatic networking process of the nodes without manual operation.

DETAILED DESCRIPTION

The present invention will be further described in detail below with reference to the embodiments and drawings, but the embodiments of the present invention are not limited thereto.

Example 1

Figure 1:
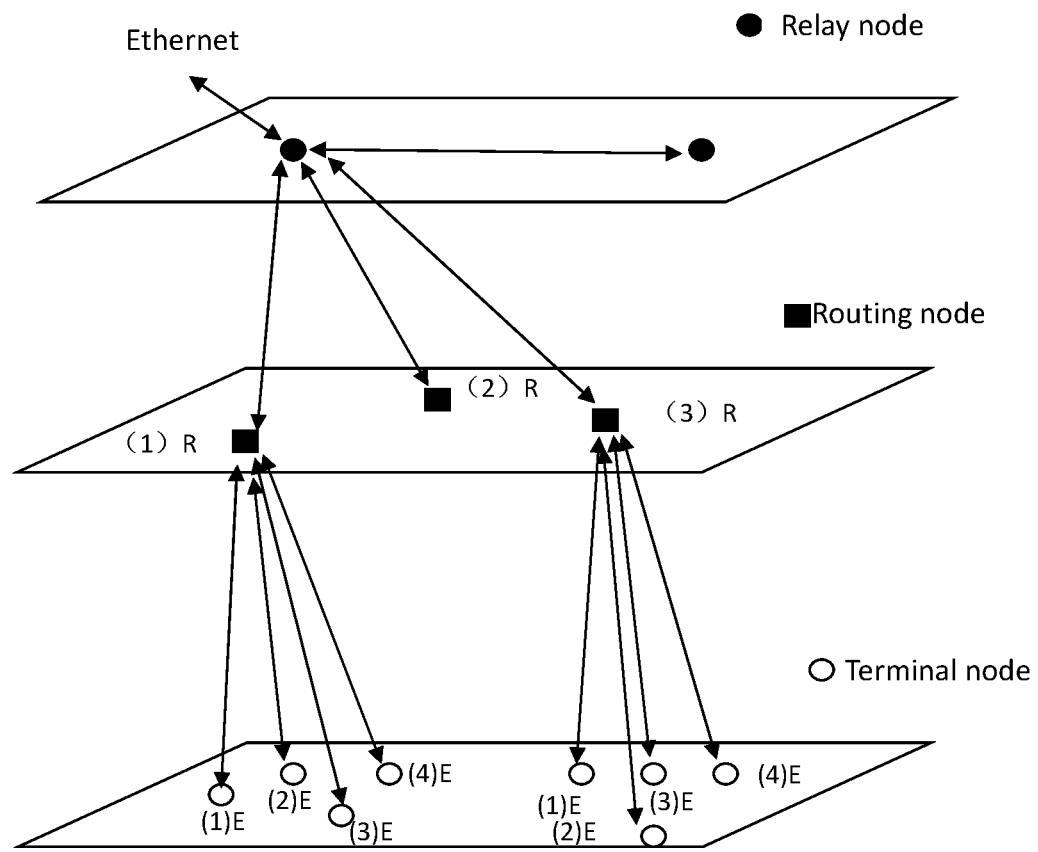
FIG. 1 is a structural diagram of a layered network of this embodiment.

In this embodiment, the automatic networking adopts a layered network structure to reduce the collision probability in the data transmission process in a polling manner. The network adopts layered control, and the whole network is divided into three control layers, which are a relay control layer, a routing control layer, and a terminal control layer. The frequency control of each layer adopts the automatic frequency hopping control algorithm of different frequency bands. The power control adopts the power adaptive adjustment algorithm to ensure the reliability of data transmission and the controllability of the network. The layered network structure is shown in FIG. 1. In FIG. 1, the relay node has an Ethernet communication function, an automatic frequency hopping function, and a frequency allocation function, and the network connection with the subordinate routing node is a star connection. The routing node R and the subordinate terminal node also adopt a star connection, with dual-frequency working mechanism, adaptive power setting, automatic frequency hopping, etc. E is a terminal node, which is a simple functional node with data upload, 485 communication, working status detection and control and other functions.

Figure 4:
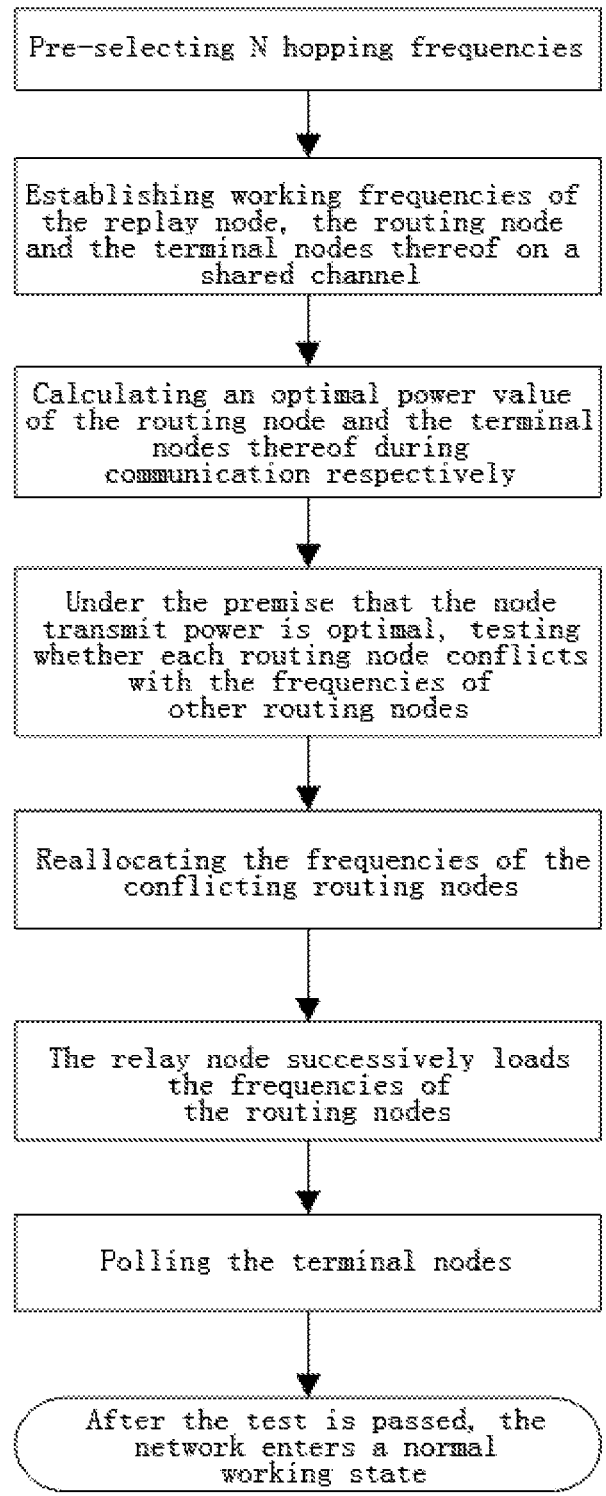
FIG. 4 is a schematic flow chart of a method of this embodiment.

Based on the foregoing network structure, the method for wireless automatic networking in this embodiment refers to FIG. 4, and includes the following steps:

S1, pre-selecting N working channels between working frequency bands as N hopping frequencies;

S2, setting an RSSI threshold of the routing node, wherein when an RSSI detected in real time is higher than the RSSI threshold, the routing node determines that it is interfered, reports to the corresponding relay node to apply for frequency hopping, and the relay node hops and sends a beacon to the routing node, and if the routing node does not receive the beacon, the routing node hops to search and track until the beacon is received, to ensure that the relay node shares the same channel with each routing node, and the routing node locks the shared channel;

S3, establishing working frequencies of the routing node and each terminal node on the shared channel, calculating an optimal power value of the routing node and each terminal node during communication respectively, and then testing whether each routing node conflicts with the frequencies of other routing nodes under the premise that the transmit power of the routing node and the terminal node is optimal, and if so, the frequencies of the conflicting routing nodes are reallocated until the frequencies of the routing nodes do not conflict; and S4, loading, by the relay node, the frequency of each routing node successively, wherein when the routing node receives a frequency value, it first notifies each terminal node to change frequency on the shared channel, and confirms that each terminal node receives frequency-changing data, and then automatically changes the frequency from a shared frequency to a new frequency; after a polling test is performed on each terminal node on the new frequency, the frequency being successfully loaded is reported to the relay node; and after all the routing nodes complete frequency loading, the network enters a normal working state.

The above method will be specifically described below in detail for each control layer.

First, the relay node control layer.

The control layer is mainly used to implement networking, realize communication with an Ethernet network, and set a routing frequency of the relay node control layer and a frequency hopping area of the layer.

(I) Networking Principles

Layered control, polling data transmission, and frequency hopping communication are the basic principles.

1. Layered control: The relay node is the core and communicates directly with the routing node; the routing node communicates wirelessly with the terminal node.

2. Polling data transmission: In order to avoid the collision probability of the data transmission, the unique handshake mechanism of one question and one answer in the same channel is used for polling communication. Polling number=number of routing nodes.

3. Frequency hopping communication: In order to solve the interference problem of the relay node control layer, the RSSI threshold being listened by a carrier is used as a reference to determine whether the relay node hops. The frequency hopping range selects N working channels between the working frequency bands, denoted as f1, f2, . . . , fN, respectively, and written into a relay node hopping table.

(II) Setting the Frequency of the Relay Node and the Frequency Hopping Area of the Layer.

Because the relay node and the routing node are susceptible to external interference, the design idea of the relay node sharing channel for frequency hopping, the routing node frequency hopping for search and tracking, and the terminal node polling for reception is adopted.

1. Setting of the RSSI Threshold of the Routing Node.

The routing node samples an RSSI value of a listening channel on the N working channels on the N working channels in a frequency hopping area for time T1, and takes an RSSI average value on the N channels, and based on the average value, after an increment, it is used as the RSSI threshold of the routing node, and the RSSI threshold is updated every T2 time 2. Principle of Frequency Selection and Frequency Hopping of Relay Nodes One smallest channel of the RSSI values of the N channels is selected as the operating frequency of the current relay node. When the RSSI detected in real time is higher than the RSSI threshold, the relay node hops and the frequency hopping adopts cyclic frequency hopping.

3. Rules for Generating the Same-Frequency Beacon by the Relay Node

Figure 2:
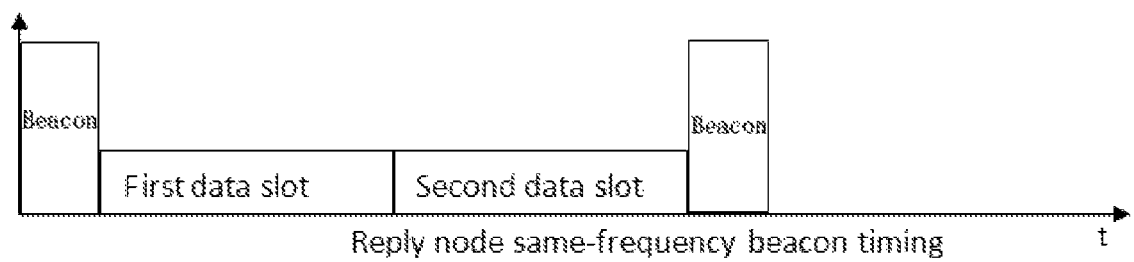
FIG. 2 is a timing diagram of a same-frequency beacon generated by a relay node in this embodiment.

As the core of the network, the relay node must operate synchronously with the network system. The design of the synchronous beacon is shown in FIG. 2. Data slots are provided between two beacons, and the data slots can be divided into first data slot and second data slot according to different roles. When the relay node and the routing node are to be synchronized to the shared channel, the relay node simultaneously transmits a beacon to each routing node. The beacon includes a broadcast data packet. The broadcast data packet includes a certain identifier. If the routing node receives the beacon, it indicates that its shared channel is the same as the relay node. Otherwise, the routing node needs to hop for search and tracking until the beacon is received to ensure that the relay node shares the same channel with each routing node. The first data slot is used to implement data exchange between the relay node and each routing node under the shared channel. The second data slot is used to implement data exchange between the routing node and each terminal node under the channel allocated by each routing node.

4. The Decision Principle that the Relay Node Determines that it Cannot Communicate with the Routing Node.

When the relay node sends out the M groups of beacons, in theory, the channels of each routing node can jump to the shared channel. Polling is performed from the first data slot 1 from the (M+1)th group, and if a reply is received from the routing node, it is determines that the channel is shared. Otherwise, the relay node continues to poll without stopping other work. If there is no reply for X times, it reports through the Ethernet and the routing node is determined to be fault-handed.

5. Routing Node Frequency Hopping Tracking Shared Channel and Optimal Transmit Power Setting Principle The method of cyclic frequency hopping to search and track beacons is as follows:

(1) Frequency hopping slot setting: The routing node is in a receiving state, and a receiving slot of each frequency is set to T3 to ensure that the beacons of any frequency can be tracked under the slots of N different frequencies. When more than P beacon data packets are continuously received, the receiving frequency is locked and the shared channel is entered.

(2) Setting of optimal transmit power of the routing node: The relay node sends to the routing node again the RSSI data detected when the routing node returns data, and the routing node adjusts its transmit power to the optimal transmit power value.

(3) The second data slot transmission slot setting: if the routing node still does not receive any beacon after the slots of P different frequencies have passed, it indicates that the relay node does not send any beacon or the transmit power is small, at this time, a search state is entered, and under the search state, in addition to completing the search for N channels, the data exchange slot of the routing node and its terminal node is also included to realize the periodic control of the terminal node by the routing node; meanwhile, after searching for one cycle, the power of the routing node is increased by one level, and if no beacon is received when the power is increased to the maximum, it is deemed that the relay node does not send any beacon.

Figure 3:
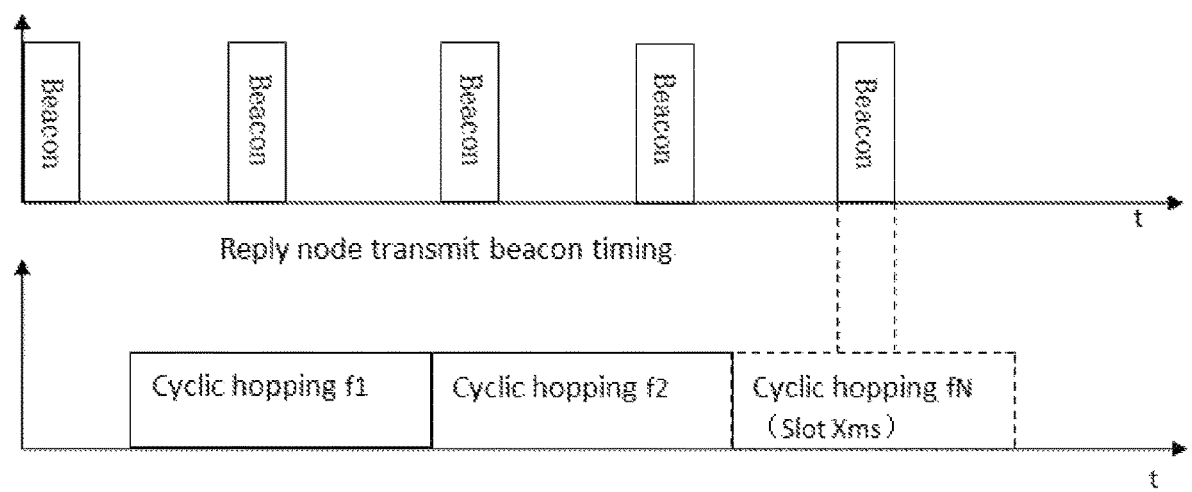
FIG. 3 is a timing diagram of a routing node performing frequency hopping and beacon tracking according to this embodiment.

(4) Initial value setting of frequency hopping: when the beacon data packet is suddenly not received if the frequency of the routing node is in a locked frequency state, the current frequency is used as the initial value of the frequency hopping search to start searching. Referring to FIG. 3, the relay node transmits a beacon according to a certain transmission timing, wherein the routing node works on the fN frequency. Once the beacon packet is suddenly not received, the routing node starts from the fN frequency and performs a frequency hopping search.

II. The Routing Node Control Layer

A dual frequency working mechanism is adopted. It mainly realizes the network-joining network communication, frequency and power setting and dynamic adjustment of the terminal node.

(I) Network-Joining Communication Between the Routing Node and the Terminal Node 1. Generation of Routing Node Synchronization Beacon and Selection of Starting Frequency For a routing node, when the relay node works in the second data slot, the relay node sends a shared frequency beacon to the terminal node to synchronize the terminal nodes to the shared frequency, and the method and principle are the same as the frequency hopping tracking of the relay node is the same and will not be repeated here. Finally, the working frequencies of the routing node and its terminal nodes are established on the shared channel.

2. The Optimal Power Setting of the Routing Node (Set on the Shared Frequency)

The routing node communicates with each terminal node in a polling manner in the second data slot. In the data transmission process, the power setting of the relay node and the routing node is the same, and the optimal power value for communication with the terminal node is obtained respectively, denoted as Ps1, Ps2, ... Psk. Psk is the optimal power value of the kth terminal node, and the maximum value Psimax is taken as the optimal value of the routing node.

3. The Optimal Power Setting of the Terminal Node (Set on the Shared Frequency)

The routing node communicates with each terminal node in a polling manner in the second data slot. In the data transmission process, the power settings of the relay node and the routing node are the same, and the terminal node can obtain the optimal power value for communication with the routing node respectively, denoted as Pe1, Pe2, ... Peu. Peu is the optimal power value of the uth terminal node, and the power of each terminal node is set to the optimal value.

4. Reporting the Optimal Power Settings of Each Terminal Node to the Relay Node.

(II) Routing Node Frequency Allocation Principle

That is, under the premise that the node transmit power is optimal, the frequency of each routing node is not overlapped.

1. Frequency Coverage Test (Under the Shared Frequency)

The relay node broadcasts, and each routing node receives a TEST character and reports same, and instructs the routing node No. 1 to poll the terminal nodes corresponding to the routing node 1 by using the TEST character, and the reply also uses the TEST character. Then, the routing number in which the routing node No. 1 conflicts with the frequencies of other routing node areas can be detected, and uploaded to the relay node and listed in the corresponding conflict table. Similarly, the routing numbers of all routing nodes s that conflict with the frequencies of other routing nodes can be detected.

2. Forming a Routing Frequency Conflict Table. As Shown in Table 1 Below.

TABLE 1

Routing frequency conflict table

| Routing number | Frequency conflict routing number | Frequency allocation | Description |
|---|---|---|---|
| R1 | R6, R7, R2 | F1 | Scan whether there is a frequency the same as F1 among the conflicting routing numbers, and if so, change the frequency to continue scanning until the frequency is different. |
| R2 | R3, R4, R7 | F3 | Conflict with R3, perform frequency change, not select F2 because of increasing frequency isolation |
| R3 | R5, R6, R8 | F5 | Conflict with R5 and R6, perform frequency selection from low to high |
| R4 | R10, R12 | F7 | Perform frequency selection from fow to high |
| R5 | R4, R10 | F9 | |
| ... | ... | | |
| Ri | RxRy ... | | |
| ... | ... | | |
| Rk | (XXX) | | |

3. Frequency Allocation Principle

According to the number of routing numbers, the frequencies are allocated in the following order: F1, F3, F5 . . . F49, F2, F4, F6 . . . F50. Whether there is a routing number in the conflict routing numbers that is the same as the set frequency is scanned, and if any, scanning is continued from small to big frequency until the frequency is different.

4. Frequency Loading

The relay node loads the frequency of the routing node number from the routing node No. 1, when the routing node receives a frequency value, it first notifies each terminal node to change frequency on the shared channel, and confirms that each terminal node receives frequency-changing data, and then automatically changes the frequency from a shared frequency to a new frequency; after a polling test is performed on each terminal node on the new frequency, the frequency being successfully loaded is reported to the relay node; and after all the routing nodes complete frequency loading, the network enters a normal working state.

(III) Routing Node Control Layer Channel Interference Automatic Frequency Change When the second data slot of the routing node is interfered, automatic frequency change is required.

1. Distinction of the Nature of Interference

When a routing node is interfered, it can be determined whether it belongs to the frequency interference of the network system through the RSSI and the received data format.

(1) Setting of RSSI Threshold of Routing Node

The setting principle is similar to that of the relay node, except that the current RSSI is sampled three times in the case of normal communication under a set single frequency, and an average value is taken as the current RSSI threshold, and the RSSI threshold is updated every minute.

(2) Distinction of Interference

When the RSSI detected in real time is higher than the RSSI threshold, the routing node is considered to be interfered. If the data received by the routing node is an identifier of the network system, the current interference is considered to be interference of the network system; and if the routing node receives the garbled code, the current interference is considered to be external interference.

2. Handling Principle of the Network System Interference

When it is confirmed that the frequency interference of the routing node belongs to the network system, it is reported to the relay node, and the relay node invokes the routing node frequency conflict table to find the frequency of the interfered routing node number, and replaces a new frequency unused by the network in order, then test to see if interference is eliminated until interference is eliminated. The frequency at this time is the new frequency of the routing node, and the updated frequency number is recorded. For example, the routing frequency conflict table shown in Table 2 can be added on the basis of Table 1, and the updated frequency number is written in the "Frequency Update" column.

3. Handling Principles of External Interference

When it is confirmed that the frequency interference of the routing node is external interference, it is reported to the relay node, and the relay node invokes the routing node frequency conflict table to find the frequency of the interfered routing number, and replaces a new frequency that is not used by the network in sequence, then test whether the interference is eliminated until the interference is eliminated. The frequency at this time is the dynamic new frequency of the routing node, and the updated dynamic new frequency is recorded. For example, the updated frequency number can be written into the "frequency hopping update" column in the routing frequency conflict table shown in Table 2. When it is confirmed that the routing node is again interfered by the external frequency, the routing node will automatically jump back to the original frequency, which can effectively eliminate the external point frequency interference. When the routing node after the frequency update is also subject to external interference, it is the same as above, but the jump-back frequency is not the original frequency, but the updated frequency.

TABLE 2

Supplementary routing frequency conflict table

| Routing number | Frequency conflict routing number | Frequency allocation | Frequency update | Frequency hopping update | Description |
|---|---|---|---|---|---|
| R1 | | F1 | | | |
| R2 | R7 | F3 | F35 | | Frequency interfered by the system |
| R3 | | F5 | | F38 | Frequency hopping between F5 and F38 due to external interference |

TABLE 2-continued

Supplementary routing frequency conflict table

| Routing number | Frequency conflict routing number | Frequency allocation | Frequency update | Frequency hopping update | Description |
|---|---|---|---|---|---|
| R4 | | | F7 | | |
| R5 | | | F9 | | |
| ... | ... | | | | |
| Ri | RxRy ... | | | | |
| ... | ... | | | | |
| Rk | (XXX) | | | | |

III. Terminal Node Control Layer

To achieve wireless access with the routing node, the terminal node only has the response function, and its working frequency is controlled by the routing node. Similarly, the terminal node also has the function of frequency search and automatic power adjustment.

The above-described embodiments are preferred embodiments of the present invention, but the embodiments of the present invention are not limited to the above-described embodiments, and any other changes, modifications, substitutions, combinations, and simplifications thereof may be made without departing from the spirit and scope of the invention should all be equivalent replacements and are included in the scope of the present invention.

The invention claimed is:

1. A method for wireless automatic networking, wherein a network adopts a layered network structure, including a relay layer, a routing layer subordinate to the relay layer and a terminal layer subordinate to the routing layer, a first star connection is adopted between a relay node on the relay layer and a routing node on the subordinate routing layer, and a second star connection is also adopted between the routing node and a terminal node on the subordinate terminal layer, the method comprising:

pre-selecting N, N equal to or greater than 1, working channels between working frequency bands as N hopping frequencies;

setting an Received Signal Strength Indicator (RSSI) threshold of the routing node, wherein when an RSSI detected in real time is higher than the RSSI threshold, the routing node determines that it is interfered, reports to a corresponding current relay node to apply for frequency hopping, and the relay node hops among multiple frequencies and sends a beacon to the routing node, and if the routing node does not receive the beacon, the routing node hops among the multiple frequencies to search and track until the beacon is received, to ensure that the current relay node shares a same channel with each routing node, and the routing node locks the shared channel;

establishing working frequencies of the routing node and each terminal node on the shared channel, calculating an optimal power value of the routing node and each terminal node during communication respectively, and then testing to determine whether a working frequency of each routing node conflicts with at least one of working frequencies of other routing nodes under the premise that transmit power of the routing node and the each terminal node is optimal, and if any conflicting frequency is determine, reallocating each of the determined conflicting frequencies until the working frequencies of all routing nodes are non-conflicting; and loading and sending, by the relay node, the non-conflicting working frequency of each routing node successively, wherein when a routing node receives its non-conflicting working frequency from the relay node, the routing node notifies each terminal node, with frequency-changing data, to change frequency on the shared channel, confirms that the each terminal node receives the frequency-changing data, and automatically changes the frequency on the shared channel to the non-conflicting working frequency;

reporting, after a polling test is performed on each terminal node on the non-conflicting working frequency thereof to the relay node that the non-conflicting working frequency has been successfully loaded; and entering a normal working state of the network after all the routing nodes complete frequency loading.

2. The method for wireless automatic networking according to claim 1, further comprising:

determining frequency hopping of the relay node in which the routing node:

(1-1) samples an RSSI value of a listening channel on the N working channels in a frequency hopping area for a time period T1, and calculates an RSSI average value on the N working channels, and based on the calculated average value and after an increment of RSSI value, the RSSI value is used as the RSSI threshold of the routing node, and the RSSI threshold is updated every T2 time period; and (1-2) selects frequency of a channel with a smallest RSSI value as a working frequency of the current relay node, wherein when the RSSI detected in real time is higher than the RSSI threshold, the relay node hops and the frequency hopping adopts cyclic frequency hopping.

3. The method for wireless automatic networking according to claim 1, further comprising:

the relay node transmitting the beacon to each routing node periodically, the beacon comprising a broadcast data packet, the broadcast data packet comprising a determined flag, and a routing node, upon receiving the flag, determines that its shared channel is the same as the relay node.

4. The method for wireless automatic networking according to claim 1, wherein during a synchronization operation of the network by the relay node, the routing node uses cyclic frequency hopping for searching and tracking the beacon based on specific settings comprising:

(2-1) setting a frequency hopping slot: the routing node is in a receiving state, a receiving slot of each frequency is set to a period T3 to that the beacons of any frequency be tracked under the slots of N different frequencies, and after receiving more than P beacon data packets continuously, wherein P equal to or greater than 1, the receiving frequency is locked and the shared channel is entered;

(2-2) setting an optimal transmit power of the routing node: the relay node transmits to the routing node detected RSSI data when the routing node replies data, and the routing node adjusts its transmit power to an optimal transmit power value;

(2-3) setting a transmission slot: if the routing node still does not receive any beacon after the slots of N different frequencies have passed, it indicates that the relay node per Q does not send any beacon or the transmit power is small, a search state is entered, and under the search state, in addition to completing the search for N channels, the data exchange slot of the routing node and its terminal node is also included to realize the periodic control of the terminal node by the routing node; and after searching for one cycle, the power of the routing node is increased by one level, and if no beacon is received when the power is increased to the maximum, it is considered that the relay node does not send any beacon; and (2-4) setting of frequency hopping initial value: when the frequency of the routing node is in a locked receiving frequency state, if no beacon data packet is received, the current frequency is used as the initial hopping frequency to start the search.

5. The method for wireless automatic networking according to claim 4, further comprising:

after the relay node sends out M groups of beacons, wherein M equal to or greater than 1, starting polling from the first data slot 1 of (M+1)th group, and after receiving a reply from the routing node, it determines that the channel is shared, otherwise, the relay node continues polling under the premise of not stopping other work, and if there is no reply after sending beacons X times, wherein X equal to or greater than 1, it will report through Ethernet, and the routing node is designated as fault handling.

6. The method for wireless automatic networking according to claim 1, further comprising:

the routing node communicates with each terminal node in a polling manner, and the routing node obtains an optimal power value for communication with the terminal nodes respectively during data transmission, denoted as Ps1, Ps2, . . . , Psk, where Psk is an optimal power value for communication between the sth routing node and its corresponding kth terminal node, the maximum value of the above optimal power values is taken as the optimal power value of the sth routing node;

at the same time, the terminal nodes obtains an optimal power value for communication with the routing node, denoted as Pe1, Pe2, . . . , Peu, where Peu is an optimal power value for communication between the uth terminal node with its corresponding eth route node.

7. The method for wireless automatic networking according to claim 1, wherein the steps of testing whether each routing node conflicts with the frequency of other routing nodes further comprising:

after establishing the working frequencies of the relay node, the corresponding routing node and its terminal nodes are all established on the shared channel, and the relay node starts broadcasting, each routing node receives a TEST character and reports same, and the relay node instructs the routing node No. 1 to poll each terminal node corresponding to the routing node No. 1 with the TEST character, and also replies with the TEST character to detect a routing number in which the routing node No. 1 conflicts with the frequencies of other routing node areas, upload the relay node and list same into a corresponding conflict table; and similarly, the routing numbers of all routing nodes conflicting with the frequencies of other routing nodes are detected; and a routing frequency conflict table is formed, the conflicting table includes the routing numbers that conflict with its frequencies.

8. The method for wireless automatic networking according to claim 7, wherein the step of reallocating the frequencies of the conflicting routing nodes further comprising:

allocating the frequencies from low to high and first odd and then even according to the routing number, that is, according to the following order: F1, F3, F5, . . . , FV, F2, F4, F6, . . . , FG, where V is an odd number, G=V+1 is an even number, scanning whether there is any routing number that is the same as the set frequency among the routing numbers that conflict with its frequency, and if so, continuing scanning from small to large frequency until the frequency is different.

9. The method for wireless automatic networking according to claim 1, in the process of completing networking for communication, the routing node is monitored in real time for interference, and if it is interfered, the muting node automatically changes the frequency, and the steps further comprising:

(3-1) determining whether the current interference is the interference of the network system or the external interference through the RSSI and the received data format, and if it is the interference of the network system, step (3-2) is performed, otherwise, step (3-3) is performed;

(3-2) the current routing node reports to the relay node after suffering from the interference of the network system, and the relay node invokes the routing frequency conflict table to find the frequency of the interfered routing node number, and replaces a new frequency that is not used by the network in order, and then tests whether the interference is eliminated, and continue the process until the interference is eliminated, the frequency at this time is the new frequency of the routing node, and the updated frequency number is recorded in a frequency update table; and (3-3) the current routing node reports to the relay node after suffering from external interference, and the relay node invokes the routing frequency conflict table to find the frequency of the interfered routing node number, and replaces a new frequency that is not used by the network in sequence, and then tests whether the interference is eliminated, and continue the process until the interference is eliminated, and the frequency at this time is a dynamic new frequency of the routing node and is recorded in a frequency hopping update table; and when the routing node is confirmed to be interfered by the external frequency, the routing node will jump between the original frequency and the dynamic new frequency of the routing node.

10. The method for wireless automatic networking according to claim 9, wherein in the step (3-1), the specific step of determining whether the current interference is the interference of the network system or the external interference further comprising:

(3-1-1) setting the RSSI threshold of the routing node: under a set single frequency, if the communication is normal, current RSSI is sampled three times continuously, and an average value is taken as the current RSSI threshold, the RSSI threshold is updated every minute; and (3-1-2) when the real time detected RSSI is higher than the RSSI threshold, the routing node is considered to be interfered, and if the data received by the routing node is an identifier of the network system, the current interference is considered to be a network system interference; and if the routing node receives garbled characters, the current interference is considered to be an external interference.

\* \* \* \* \*

UNITED STATES PATENT AND TRADEMARK OFFICE
CERTIFICATE OF CORRECTION

PATENT NO. : 11,026,164 B2  
APPLICATION NO. : 16/320182  
DATED : June 1, 2021  
INVENTOR(S) : Bing Dong Page 1 of 1

It is certified that error appears in the above-identified patent and that said Letters Patent is hereby corrected as shown below:

On the Title Page

Column 1, Item (73) Assignee, Line 1, after "Polytechnic" insert -- (CN) --

In the Claims

Column 11, Line 65, Claim 1, delete "determine," and insert -- determined, --

Column 12, Line 13, Claim 1, delete "thereof" and insert -- thereof, --

Column 12, Line 50, Claim 4, after "T3 to" insert -- ensure --

Column 12, Line 64, Claim 4, after "relay node" delete "per Q"

Column 13, Line 38, Claim 6, delete "obtains" and insert -- obtain --

Column 13, Line 44, Claim 7, after "wherein" delete "the"

Column 14, Line 17, Claim 9, delete "muting" and insert -- routing --

Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*